(12) United States Patent
Shimoda

(10) Patent No.: US 7,099,540 B2
(45) Date of Patent: Aug. 29, 2006

(54) OPTICAL COUPLING DEVICE AND PROCESS FOR FABRICATION THEREOF

(75) Inventor: Tsuyoshi Shimoda, Tokyo (JP)

(73) Assignee: NEC Corporation, Tokyo (JP)

(*) Notice: Subject to any disclaimer, the term of this patent is extended or adjusted under 35 U.S.C. 154(b) by 185 days.

(21) Appl. No.: 10/341,371

(22) Filed: Jan. 14, 2003

(65) Prior Publication Data
US 2003/0138216 A1 Jul. 24, 2003

(30) Foreign Application Priority Data
Jan. 15, 2002 (JP) ............................. 2002-005415

(51) Int. Cl.
*G02B 6/26* (2006.01)
(52) U.S. Cl. .......................... 385/50; 385/49
(58) Field of Classification Search ............ 385/49–50
See application file for complete search history.

(56) References Cited

U.S. PATENT DOCUMENTS

| 4,229,067 A | * | 10/1980 | Love .......................... 385/28 |
| 4,737,004 A | * | 4/1988 | Amitay et al. ................ 385/43 |
| 5,530,781 A | * | 6/1996 | Takahashi ..................... 385/43 |
| 5,618,325 A | * | 4/1997 | Baniel .......................... 65/380 |
| 5,815,611 A | * | 9/1998 | Dhadwal ....................... 385/12 |
| 6,345,138 B1 | * | 2/2002 | Kawai et al. ................ 385/49 |
| 6,434,975 B1 | * | 8/2002 | Berkey ........................ 65/403 |

FOREIGN PATENT DOCUMENTS

| JP | 62-17708 | 1/1987 |
| JP | 8-171020 | 7/1996 |
| JP | 8-262244 | 10/1996 |
| JP | 10-221554 | 8/1998 |
| JP | 11-237515 | 8/1999 |
| JP | 2000-206352 | 7/2000 |

OTHER PUBLICATIONS

A. Takagi et al., "Low-loss and Large-scale 256ch Arrayed-Waveguide Grating Multi-Demultiplexers", Autumn Conference of Electronic Information Society, C-3-90, 2001.

* cited by examiner

*Primary Examiner*—Ellen E. Kim
(74) *Attorney, Agent, or Firm*—Young & Thompson

(57) ABSTRACT

An optical coupling device has an optical wave-guide varied in difference in specific refractive index between a clad layer and a core layer, and the optical wave-guide serves as a convergent/divergent spot size converter; since reduction in cross section of the core layer is not required for the convergent/divergent spot size converter so that the optical coupling device is produced at a high production yield.

7 Claims, 19 Drawing Sheets

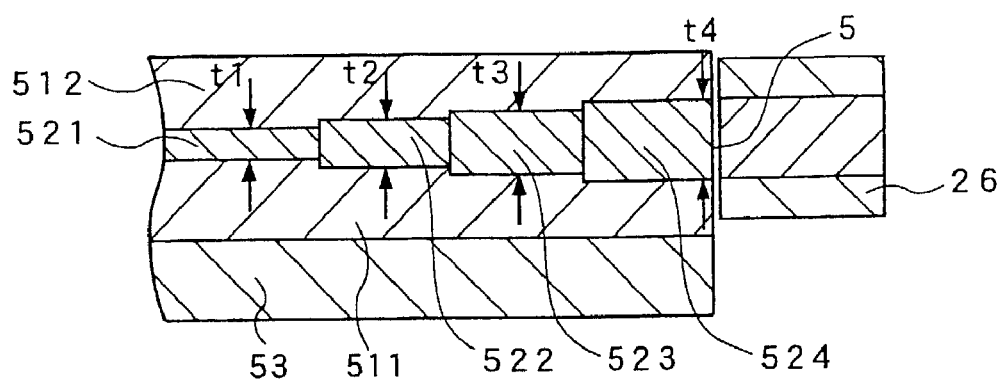
Fig. 1 3 A
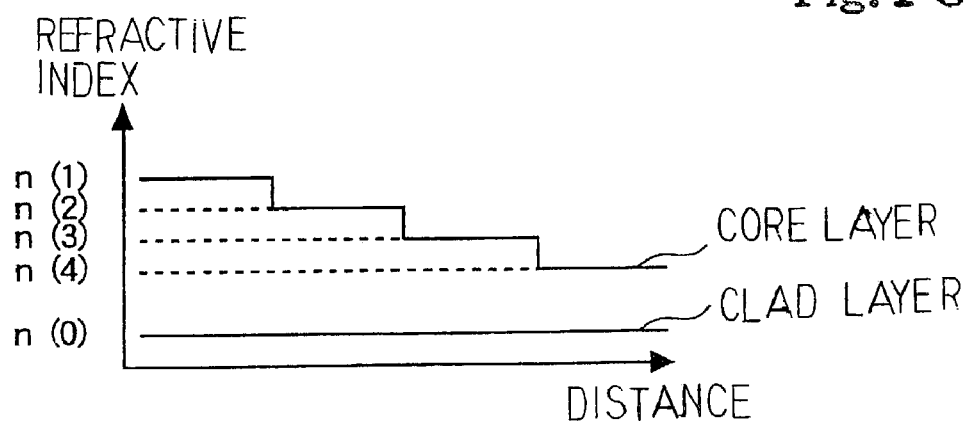
Fig. 1 3 B

OPTICAL COUPLING DEVICE AND PROCESS FOR FABRICATION THEREOF

FIELD OF THE INVENTION

This invention relates to an optical device available for the optical communication and, more particularly, to an optical coupling device having a spot size converter with plural optical wave-guides and a process for fabricating the optical coupling device.

DESCRIPTION OF THE RELATED ART

The internet has been spreading worldwide, and the optical communication systems are being commercialized. A 10 giga-bit/second system is capable of handing more than a hundred twenty thousand channels. The amount of information transferred through the channels makes great strides with the wavelength division multiplexing technologies. Optical wave-guide devices called as planar lightwave circuits are indispensable elements for the large scale communication systems. The planar lightwave circuits are usually abbreviated as PLCs.

Array wave-guide arrays, which achieve the optical multiplex/optical de-multiplex in the wavelength division multiplexing systems, and transmitting-receiving circuits, which are used in the accessing systems for the two-way communication, are examples of the planar lightwave circuits. The planar lightwave circuits are usually integrated on chips, and the chips are arranged on circuit boards. The users expect the manufacturers to scale down the planar lightwave circuits so as to reduce the occupation area. The scale-down is preferable for the manufacturers, because the number of chips concurrently fabricated on a single wafer is increased. This results in reduction of production cost.

The radius of curvature of the bend wave-guides set a limit to the chip size of the optical wave-guide devices with the optical multiplexing/optical de-multiplexing capabilities. Even if the radius of curvature is decreased, a large difference in specific refractive index between the core layer and the clad layer makes the loss at the bend wave-guides low. The optical wave-guides in the quartz system usually have the difference in specific refractive index between the core layer and the clad layer of the order of 0.7%. The loss equal to or less than 0.1 dB/cm is achieved at the radius of curvature equal to or greater than 6 millimeters. However, if the difference in specific refractive index is increased to 1.5%, it is possible to reduce the radium of curvature to 2 millimeters. If the difference in specific refractive index is increased to 4%, the manufacturer can reduce the radius of curvature to 0.5 millimeter. Thus, the large difference in specific refractive index is preferable from the viewpoint of sharp bend wave-guides, i.e., the scale-down of the chips.

Although a large difference in specific refractive index is preferable from the viewpoint of the scale-down, the large difference in specific refractive index is causative of other problems. One of the problems is increase of the coupling loss. FIG. 1 shows a typical example of the optical wave-guide device, and the prior art optical wave-guide device includes a wave-guide constituted by clad layers 2010 and a core layer 2020. The prior art optical wave-guide device has an end surface 5, and an optical fiber 26 is connected to the prior art optical wave-guide device at the end surface 5 as shown. When the difference in specific refractive index is increased, the cross-section area of the core layer 2020 is to be reduced in order to fulfill the conditions of single mode. This results in a narrow spot size. In other words, the light is to be transferred to the narrow core layer 2020 to the wide core layer of the optical fiber 26. This results in a large coupling loss. Thus, there is the tradeoff between the device size and the coupling loss.

The gap between a thin film element 2350 and a wave-guide 2310/2311/2320 is causative of the reduction in coupling loss in the prior art optical wave-guide device shown in FIG. 2. The lower clad layer 2310, upper clad layer 2311 and core layer 2320 form the wave-guide formed on a substrate 2330. A slit is formed across the wave-guide 2310/2311/2320 so that end surfaces 2340 are exposed to the slit. The thin film element 2350 such as a filter or wave plate is inserted into the slit. A plate of polymer with a negative temperature coefficient of refractive index for the athermalization may be inserted into the slit. When the wave-guide has a large difference in specific refractive index, the spot size is small, and the light beam 2360 is diffused due to the diffraction in the gap. This results in a large coupling loss between the wave-guide and the thin film element 2350 or between the wave-guide and the wave-guide.

Although the large difference in specific refractive index makes the prior art optical wave-guide device scaled down, the prior art optical wave-guide device is not commercially available for the optical module forming a part of the optical communication system, because the coupling loss is large. In order to reduce the coupling loss, a spot size converter has been proposed. The spot size converter is usually abbreviated as "SSC". The light beam is diffused through the spot size converter in the vicinity of the connecting portion to an optical fiber and the gap between the wave-guides. It is possible to form the spot size converter at any area on the wafer during the fabrication of the optical wave-guide devices.

One sort of spot size converters is axially enlarged in width toward the portion where an optical fiber is connected to the prior art optical wave-guide device. In other words, the wave-guide is increased in width in the direction of light propagation. The sort of spot size converters is hereinafter referred to as "divergent spot size converters".

The divergent spot size converters are easily realized on wafers by using the photo-lithography and an etching, because the gradually increased width is required for the wave-guides serving as the divergent spot size converters. The divergent spot size converters do not make the fabrication process complicated. Moreover, it is possible to realize the divergent spot size converters equal to or less than 1 millimeter long on the wafer. This means that the divergent spot size converters do not require any additional occupation area on the wafer. Thus, the divergent spot size converters are preferable for small-sized optical modules.

However, the divergent spot size converters are not effective against the reduction in coupling loss in a wave-guide having the difference in specific refractive index greater than 1%. This is because of the fact that the divergent spot size converters are merely increased in width through the photolithography and etching. An optical wave-guide is, by way of example, 3 microns in both width and height. In case where the optical wave-guide has the difference in specific refractive index equal to 1.9%, the coupling loss to a single mode fiber is of the order of 2.7 dB. When the divergent spot size converter is built in the optical wave-guide, the coupling loss is only reduced to 1.5 dB.

In order to deal successfully with the limit on the difference in specific refractive index, it has been proposed to reduce the width toward the end surface of an optical wave-guide device. This sort of spot size converters is hereinafter referred to as "convergent spot size converters".

FIG. 3 shows the prior art optical wave-guide device with a built-in convergent spot size converter. A clad layer 2110 and a core layer 2120 form parts of an optical wave-guide, and the optical wave-guide is exposed to the end surface 5. The optical wave-guide is coupled to an optical fiber 26. A convergent spot size converter 2130 is formed at the end portion of the optical wave-guide, and is reduced in width toward the end surface 5.

The prior art optical wave-guide device with the built-in convergent spot size converter 2130 achieves all the advantages of the prior art optical wave-guide device shown in FIG. 1, and the convergent spot size converter 2130 can reduce the coupling loss at the boundary between the optical wave-guide and the optical fiber 26 rather than the divergent spot size converter. The convergent spot size converter 2130 behaves as follows. The core layer 2120 confines light therein, and propagates the light through the convergent spot size converter 2130 to the end surface 5. When the light reaches the end surface 5, the light is released from the convergent spot size converter 2130, and is diffused. The cross section of the light beam is increased not only in the direction of width but also in the direction of height so that the coupling loss is reduced. When the convergent spot size converter is formed at the end portion of the optical wave-guide of 3 microns in both width and height, the coupling loss is reduced to 0.7 dB under the condition that the difference in specific refractive index is 1.9%.

Another countermeasure is proposed by Takagi et. al. in the proceedings of 2001 Autumn Conference of Electronic Information Society, C-3-90. The optical wave-guide proposed by Takagi et. al. is illustrated in FIG. 4. The prior art optical wave-guide device is fabricated on a substrate 2210, and a core layer 2220 is formed in the substrate 2210. An input-and- output wave-guide substrate 2211 is provided between the substrate 2210 and the optical fiber 26, and a core layer 2221 is formed in the input-and- output wave-guide substrate 2211. The input-and- output wave-guide 2211/2231 is optically coupled to the optical fiber 26. A spot size converter 2230 is formed in the end portion of the core layer 2220, and is coupled to the core layer 2221. Another spot size converter 2231 is formed in the end portion of the core layer 2221, and is coupled to the optical fiber 26.

The input-and-output wave-guide device has the difference in specific refractive index at a certain value between the difference in specific refractive index of the prior art optical wave-guide device and the difference in specific refractive index of the optical fiber 26. The input-and-output wave-guide device is coupled to the prior art optical wave-guide device as follows. Light is incident onto the optical wave-guide of the prior art optical wave-guide device. Then, the light beam is output from the end surface of the prior art optical wave-guide device. The input-and- output optical wave-guide device is aligned with the prior art optical wave-guide device by monitoring the output light, and is adhered thereto by using adhesive compound. The difference in specific refractive index is stepwise varied at both end surfaces of the input-and- output optical wave-guide device so that the mode mismatch is moderated. This results in reduction of coupling loss. However, the excess loss is not ignoreable due to the misalignment of the optical axes. The coupling loss is reduced to 0.8 dB in the conditions same as the above-described prior art optical wave-guide devices.

Although the convergent spot size converter can reduce the coupling loss rather than the divergent spot size converter, the convergent spot size converter can not satisfy the users. The users wish to further reduce the loss of the optical module, and, for this reason, request the manufacturers to develop low coupling-loss optical wave-guide devices.

As described hereinbefore, the convergent spot size converter is attractive. However, a problem is encountered in the prior art optical wave-guide device with built-in convergent spot size converter in that the coupling loss is rather increased when the width is reduced beyond a limit. This is because of the fact that the light enters the radiation mode in the extremely narrow optical wave-guide. The prior art convergent spot size converter can not achieve the low coupling loss requested by the users.

A problem inherent in the prior art fabrication process for the convergent spot size converter is a low production yield. In order to scale down the planar lightwave circuit devices, it is necessary to make the difference in specific refractive index larger, and high precision patterning technologies are required for the optical wave-guide with a large difference in specific refractive index. For example, an optical wave-guide with the difference in specific refractive index equal to or greater than 1.5% requires the convergent spot size converter, the tip of which is to be equal to or less than 1 micron wide. However, it is difficult to form such a narrow spot size converter at a high production yield.

On the other hand, the following problems are encountered in the prior art input-and- output optical wave-guide device. First, the complicated assembling work is required for the prior art input-and- output optical wave-guide device. The larger the difference in specific refractive index, the smaller the tolerance in the alignment between the prior art planar lightwave circuit device and the prior art input-and-output optical wave-guide device. This means that the alignment work is hard.

Another problem is the volume of the resultant device. The prior art input-and-output optical wave-guide device is added to the prior art planar lightwave circuit device so that the resultant device is bulky. Yet another problem is the limitative usage. The prior art input-and-output optical wave-guide device is to be fixed to the end surface of the prior art planar lightwave circuit device. This means that the prior art input-and-output optical waveguide is hardly built in the prior art planar lightwave circuit device.

The prior art spot size converters have been developed for coupling the prior art planar lightwave circuit device having a certain spot size to an optical element such as the optical fiber having a spot size larger than that of the prior art planar lightwave circuit device. The present inventor seems to be available for a coupling from an optical wave-guide with a relatively large spot size to another optical element with a relatively small optical size. In this application, the spot size converter is expected to reduce the spot size. However, there is not a spot size converter for reducing the spot size.

Another problem due to a large difference in specific refractive index is elongation of the wave-guide. In case where the wave-guide with a large difference in specific refractive index is formed in an optical interference circuit having proximity wave-guides such as a directional optical coupler, the wave-guide with a large difference in specific refractive index is prolonged, and, accordingly, the optical device is bulky. Although the same coupling length is achieved by reducing the gap between the wave-guides of the directional optical coupler, the gap is depending upon the precision of the patterning technologies. When the difference in specific refractive index is increased, the coupling length is also increased in so far as the manufacturer uses the same patterning technologies.

SUMMARY OF THE INVENTION

It is therefore an important object of the present invention to provide an optical coupling device, which is compact without increase of the coupling loss. Even a proximity wave-guide interference device is incorporated in the optical coupling device, the optical wave-guide device is not enlarged. A built-in spot size converter of the optical coupling device can reduce the spot size.

It is also an important object of the present invention to provide an optical coupling device, which has a built-in spot size converter at an arbitrary position in an optical wave-guide. This means that the built-in spot size converter is available for a plate-like optical element inserted into a slit formed in an optical wave-guide.

It is another important object of the present invention to provide a process for fabricating the optical coupling device, which is large in production yield and large in tolerance.

In accordance with one aspect of the present invention, there is provided an optical coupling device comprising a substrate having a major surface and at least one optical wave-guide extending in a certain direction, including a clad layer formed over the major surface and a core layer formed in the clad layer and having plural sections different in difference in specific refractive index between the clad layer and the core layer in the certain direction.

In accordance with another aspect of the present invention, there is provided an optical coupling device comprising a substrate having a major surface and plural optical wave-guides each including a clad layer formed over the major surface and a core layer formed in the clad layer, optically coupled to one another, having at least one spot size converter for varying a spot size of light propagated therethrough toward a light output surface, the core layers of the plural optical wave-guides is decreased in refractive index toward the light output surface, at least one of the core layers spaced from the light output surface is decreased in cross section, and another of the core layers close to the light output surface being increased in cross section.

In accordance with yet another aspect of the present invention, there is provided an optical coupling device comprising a substrate having a major surface and plural optical wave-guides each formed with a clad layer over the major surface and a core layer formed in the clad layer, optically coupled to one another and forming a proximity wave-guide interference circuit together with a core layer of another optical wave-guide provided in the vicinity of at least one of the plural optical wave-guides, and at least two of the plural optical wave-guides optically coupled to each other in the region assigned to the proximity wave-guide interference circuit is different in difference in specific refractive index from each other.

In accordance with still another aspect of the present invention, there is provided a process for fabricating an optical coupling device comprising the steps of preparing a substrate structure, successively depositing a first layer for a lower clad layer and a second layer for a first core layer over the substrate structure, partially removing at least the first layer, depositing a third layer for a second core layer over the entire surface, the third layer being different in refractive index from the first layer, patterning the first and third layers so that the first core layer and the second core layer is formed on the lower clad layer in such a manner as to be aligned with one another and depositing a fourth layer serving as an upper clad layer.

BRIEF DESCRIPTION OF THE DRAWINGS

The features and advantages of the optical coupling device and process will be more clearly understood from the following description taken in conjunction with the accompanying drawings, in which

FIG. 13A is a cross sectional view showing the structure of yet another sample of the optical coupling device implementing the first embodiment, FIG. 13B is a graph showing the refractive index of clad/core layers of the sample.

DESCRIPTION OF THE PREFERRED EMBODIMENTS

FIRST EMBODIMENT

Figures 5A, 5B:
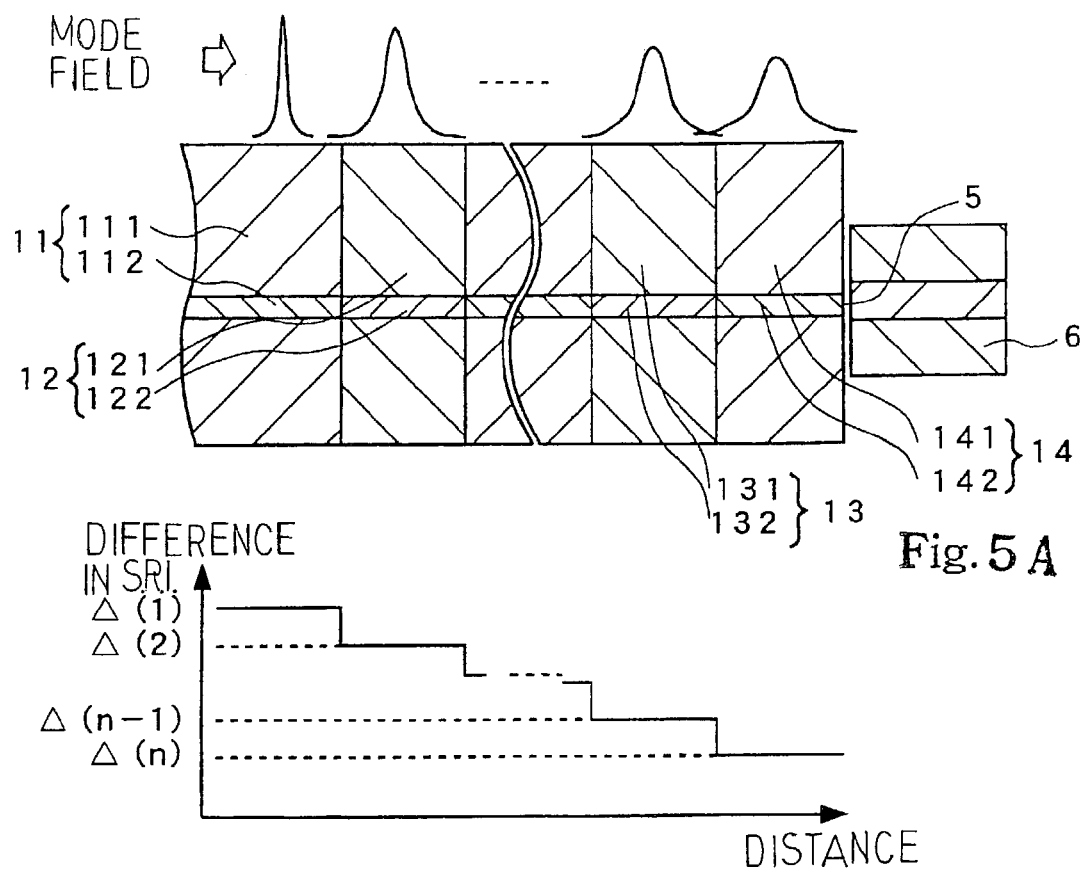
FIG. 5A is a cross sectional view showing the structure of an optical coupling device according to the present invention.
FIG. 5B is a graph showing the difference in specific refractive index, i.e., S.R.I varied with distance from a certain position in an optical wave-guide to an end surface.

Referring to FIG. 5A of the drawings, an optical coupling device embodying the present invention is formed with the first optical wave-guides 11, second optical wave-guide 12, . . . $(n-1)^{th}$ optical wave-guide 13 and $n^{th}$ optical waveguide 14, and has an end surface 5. The optical coupling device is cut off along a certain horizontal cross-section so that the FIG. 5A is a plan view showing the certain horizontal cross-section. The $n^{th}$ optical wave-guide is exposed to the end surface 5 so that the output light is radiated from then $n^{th}$ optical wave-guide on the end surface 5. In this instance, the core layers of the first optical wave-guide 11 to then $n^{th}$ optical wave-guide 14 are equal in width to one another. However, the core layers may vary the width depending upon the specific refractive index thereof.

The first optical wave-guide 111 has the first clad layer 111 and the first core layer 112, the second optical wave-guide 12 has the second clad layer 121 and the second core layer 122, the $(n-1)^{th}$ optical wave-guide 13 has the $(n-1)^{th}$ clad layer 131 and the $(n-1)^{th}$ core layer 132, and the $n^{th}$ optical wave-guide 14 has the $n^{th}$ clad layer 141 and the $n^{th}$ core layer 142. The first to $n^{th}$ optical wave-guides 11 to 14 are formed on a substrate in such a manner as to be optically coupled to one another, and the core layers 112 to 142 are aligned with one another.

The optical waveguides 11, 12, 13 and 14 have the difference in specific refractive index different from one another, and the values of the difference in specific refractive index of those optical wave-guides 11, 12, 13 and 14 are expressed as $\Delta(1)$, $\Delta(2)$, $\Delta(n-1)$ and $\Delta(n)$. The values of the difference in specific refractive index $\Delta(1)$, $\Delta(2)$, $\Delta(n-1)$ and $\Delta(n)$ are shown in FIG. 5B. When the optical wave-guide is spaced from the end surface 5, the difference in specific refractive index is increased, i.e., $\Delta(1)>\Delta(2)>\Delta(n-1)>\Delta(n)$. A bend wave-guide is to have the largest value of the difference in specific refractive index. In this instance, the first optical wave-guide 11 serves as the bend wave-guide. The light, which is propagated through the optical wave-guides 11 to 14 to the end surface 5, exhibits the mode field shown in FIG. 5A, and the spot size is enlarged from the first optical wave-guide 11 toward the $n^{th}$ optical wave-guide 14. For this reason, the optical wave-guide device implementing the first embodiment is preferable for an optical coupling to another optical element with a large spot size. Otherwise, the light is radiated from the end surface 5 as a free progressive wave. An example of the optical element with a large spot size is an optical fiber 6. In FIG. 5A, the light beam is propagated from the $n^{th}$ optical wave-guide 14 to the optical fiber 6.

Thus, the spot size of the light beam is enlarged through the propagation along the optical wave-guides 11 to 14 by virtue of the reduction in the difference in specific refractive index toward the end surface 5. It is not necessary to reduce the width of the $n^{th}$ optical guide 14. For this reason, the coupling loss is never increased. The optical coupling device implementing the first embodiment is improved in coupling loss rather than the prior art convergent spot size converter.

SECOND EMBODIMENT

Figure 6:
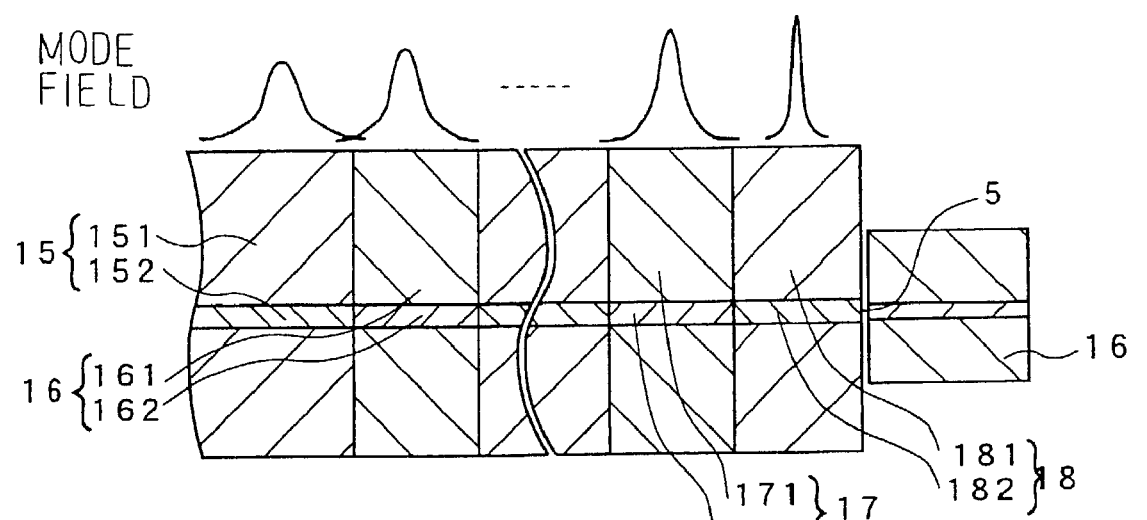
FIG. 6A is a cross sectional view showing the structure of another optical coupling device according to the present invention.
FIG. 6B is a graph showing the difference in specific refractive index varied with distance from a certain position in an optical wave-guide to an end surface.
Figure 6:
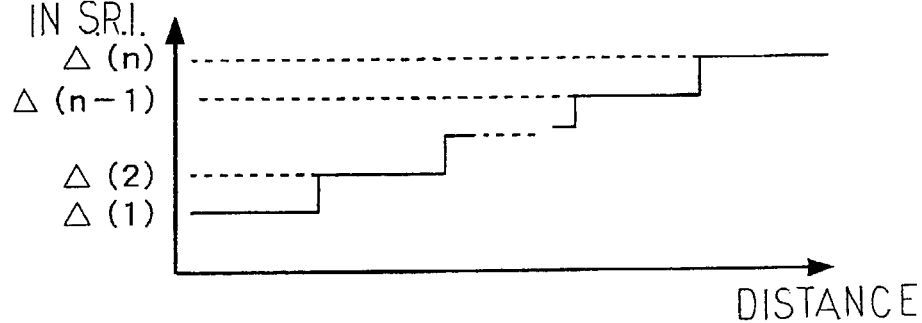

FIG. 6A shows another optical coupling device embodying the present invention. The optical coupling device implementing the second embodiment is formed with the first optical wave-guides 15, second optical wave-guide 16, . . . $(n-1)^{th}$ optical wave-guide 17 and $n^{th}$ optical wave-guide 18, and has an end surface 5. The optical coupling device is also cut along a certain horizontal cross-section so that the FIG. 6A is a plan view showing the certain horizontal cross-section. The $n^{th}$ optical wave-guide 18 is exposed to the end surface 5 so that the output light is radiated form $n^{th}$ optical wave-guide on the surface 5. In this instance, the core layers of the first optical wave-guide 15 to the $n^{th}$ optical wave-guide 18 are equal in width to one another. However, the core layers may vary the width depending upon the specific refractive index thereof.

The first optical wave-guide 15 has the first clad layer 151 and the first core layer 152, the second optical wave-guide 16 has the second clad layer 161 and the second core layer 162, the $(n-1)^{th}$ optical wave-guide 17 has the $(n-1)^{th}$ clad layer 171 and the $(n-1)^{th}$ core layer 172, and the $n^{th}$ optical wave-guide 18 has the $n^{th}$ clad layer 181 and the $n^{th}$ core layer 182. The first to $n^{th}$ optical wave-guides 15 to 18 are formed on a substrate in such a manner as to be optically coupled to one another, and the core layers 152 to 182 are aligned with one another.

The optical wave-guides 15, 16, 17 and 18 have the difference in specific refractive index difference from one another, and the values of the difference in specific refractive index of those optical wave-guides 15, 16, 17 and 18 are expressed as $\Delta(1)$, $\Delta(2)$, $\Delta(n-1)$ and $\Delta(n)$. The values of the difference in specific refractive index $\Delta(1)$, $\Delta(2)$, $\Delta(n-1)$ and $\Delta(n)$ are shown in FIG. 6B. When the optical wave-guide gets close to the end surface 5, the difference in specific refractive index is increased, i.e., $\Delta(1)<\Delta(2)<\Delta(n-1)<\Delta(n)$. The light, which is propagated through the optical wave-guides 15 to 18 to the end surface 5, exhibits the mode field shown in FIG. 6A, and the spot size is decreased from the first optical wave-guide 15 toward the $n^{th}$ optical wave-guide 18. For this reason, the optical wave-guide device implementing the second embodiment is preferable for an optical coupling to another optical element with a spot size smaller than that of the optical coupling device. In FIG. 6A, the light beam is propagated from the n$^{th}$ optical wave-guide 18 to the optical fiber 16, which has the spot size smaller than that of the optical coupling device.

Thus, the spot size of the light beam is reduced through the propagation along the optical wave-guides 15 to 18 by virtue of the increase of the difference in specific refractive index toward the end surface 5. Even if the optical fiber 16 is misaligned with the optical coupling device implementing the second embodiment, the light beam is surely transferred from the optical coupling device to the optical fiber in so far as the amount of misalignment is fallen within the difference in spot size between the optical wave-guide 18 and the optical fiber 16. This means that, the coupling loss is never increased. The optical coupling device implementing the second embodiment has a large tolerance in the alignment work without increasing the coupling loss.

Evaluation of Optical Coupling Device

Figure 7A:
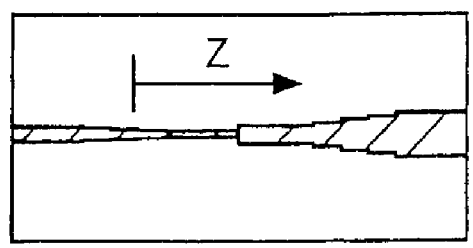
FIG. 7A is a view showing the definition of a distance Z.
Figure 7B:
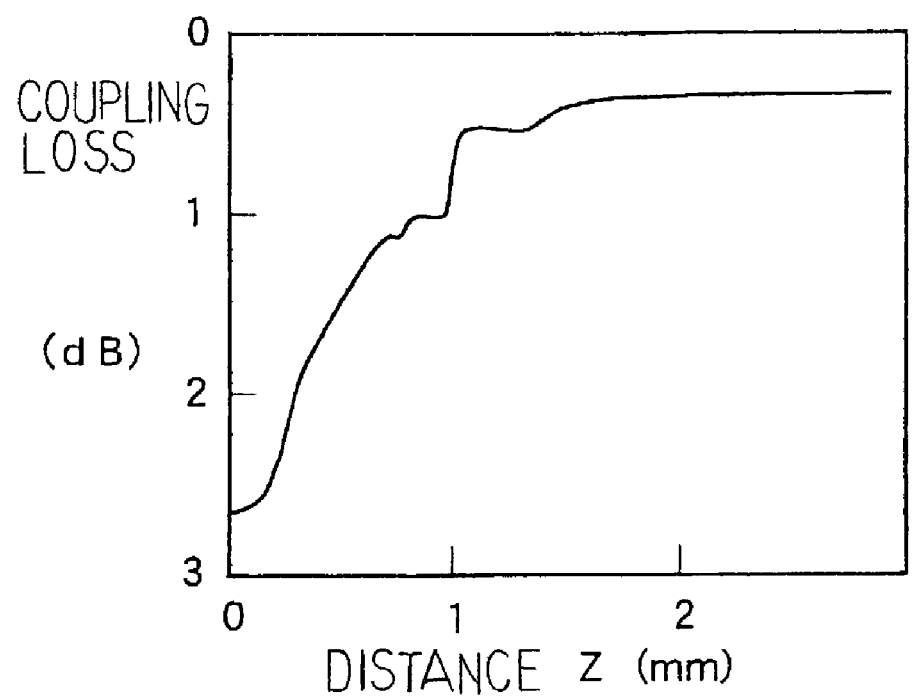
FIG. 7B is a graph showing the coupling loss in terms of the distance.

The present inventor simulated the coupling loss between the optical coupling devices with large difference in specific refractive index and a single mode optical fiber through a beam propagation method, and FIGS. 7A and 7B illustrate the simulation. In FIG. 7B, abscissa is indicative of distance Z, and the axis of coordinates represents the coupling loss. The coupling loss is the total of the coupling loss at the boundary between an optical wave-guide with a large difference in specific refractive index and an optical wave-guide with a small difference in specific refractive index and the coupling loss to an optical fiber. The optical wave-guide with the large difference in specific refractive index was tapered from Z=0, and the distance Z was increased in the direction in which the light was propagated. In the first embodiment, the optical wave-guide was coupled to the optical fiber at Z=2 millimeters. The coupling loss was 2.7 dB at Z=0, i.e., the immediately before the spot size converter. The coupling loss was reduced to 1 dB at a position immediately before Z=1 millimeter. This was due to the convergent spot size converter at the tip of the optical wave-guide with the large difference in specific refractive index. The optical wave-guide with the large difference in specific refractive index was coupled to the optical wave-guide with the small difference in specific refractive index at Z=1 millimeter, and the coupling loss was reduced to of the order of 0.5 dB at Z=1 millimeter. Thus, the optical wave-guide with the difference in refractive index, the value of which was between the value of the large difference in specific refractive index and the value of the difference in specific refractive index of the optical fiber, made the mode mismatch reduced. Moreover, the divergent spot size converter of the optical wave-guide with the small difference in specific refractive index was effective against the coupling loss. The coupling loss was reduced to 0.3 dB by virtue of the divergent spot size converter. The present inventor confirmed that the coupling loss between the optical wave-guide with the spot size converter according to the present invention and the optical fiber was reduced from 2.7 dB to 0.3 dB. The minimum coupling loss of the prior art convergent spot size converter was 0.7 dB. Thus, the spot size converter according to the present invention was effective against the coupling loss.

Figure 8:
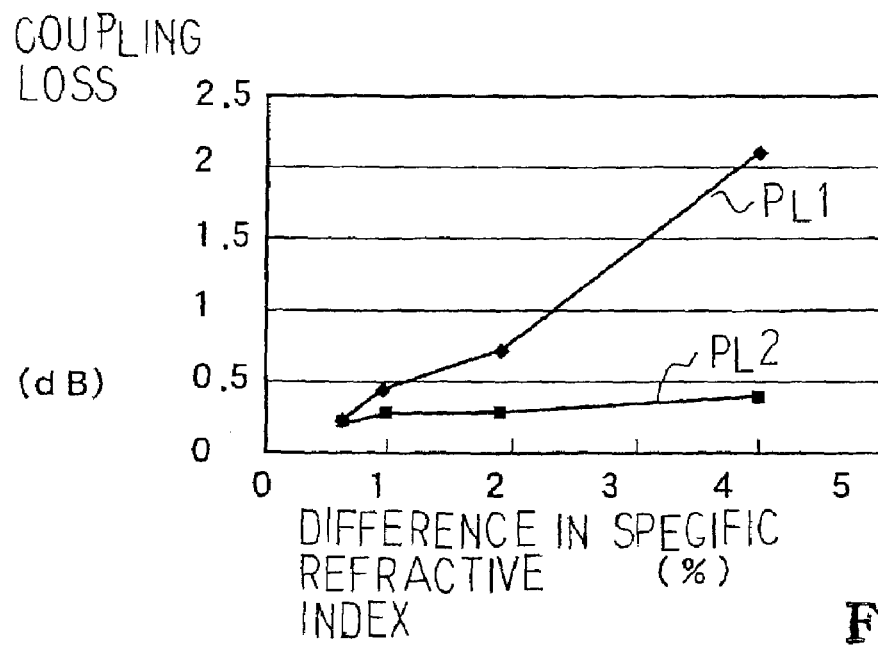
FIG. 8 is a graph showing the relation between the coupling loss and difference in specific refractive index measured for an optical coupling device and the prior art optical coupling device with the convergent spot size converter.
Figure 1:
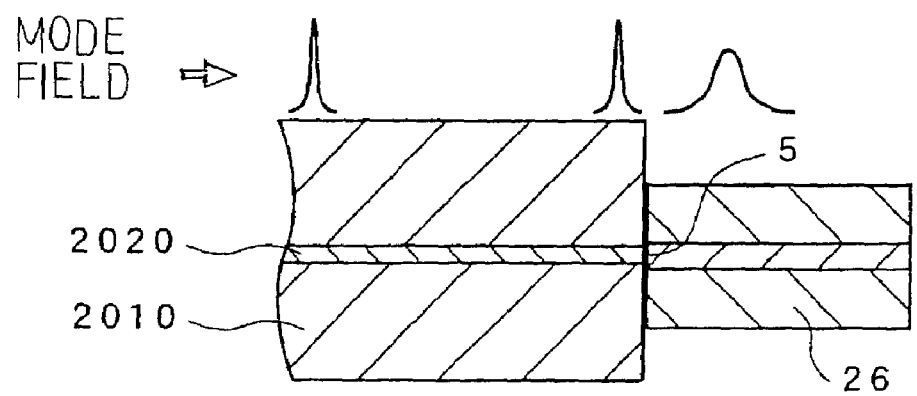
FIG. 1 is a cross sectional view showing the structure of the prior art optical wave-guide device.

FIG. 8 shows the coupling loss in terms of the difference in specific refractive index. Plots PL1 stand for the prior art optical coupling device with the convergent spot size converter, and plots PL2 is representative of the optical coupling device according to the present invention. Although the prior art optical wave-guide increased the coupling loss together with the difference in specific refractive index, the optical coupling device according to the present invention kept the coupling loss substantially constant between 0.65% and 4%, and the coupling loss at 4.0% was only 0.4 dB. The prior art optical coupling device exhibited the coupling loss approximately equal to that of the present invention at 0.65%. However, the coupling loss was increased together with the difference in specific refractive index. The coupling loss at 4% exceeded 2 dB. Thus, the optical wave-guide according to the present invention was quite effective against the coupling loss in the extremely wide range of the difference in specific refractive index.

Samples of First Embodiment

Figure 9:
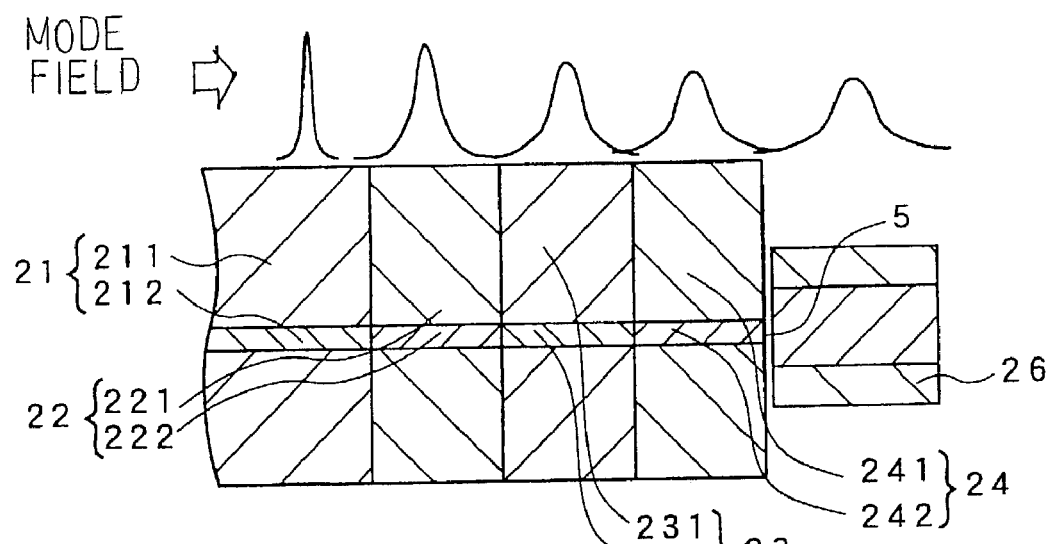
FIG. 9A is a cross sectional view showing the structure of a sample of the optical coupling device implementing the first embodiment.
FIG. 9B is a graph showing the relation between the difference in specific refractive index and a distance of the optical wave-guide in the sample.
Figure 9:
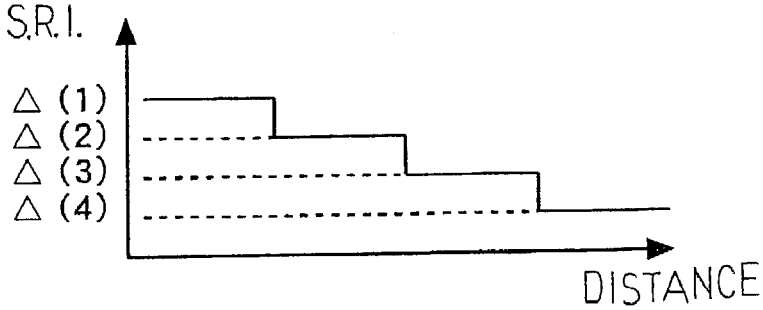

FIG. 9A shows a sample of the optical coupling device implementing the first embodiment. The cross section was in parallel to the major surface of the substrate so that FIG. 9A is a plan view. The sample is hereinafter referred to as "first sample". The first sample had an optical wave-guide consisting of four wave-guides 21, 22, 23 and 24. The values of the difference in specific refractive index was 2% in the leftmost wave-guide 21, 1.5% in the wave-guide 22, 1.0% in the wave-guide 23 and 0.5% in the wave-guide 24. Thus, the difference in specific refractive index was stepwise reduced toward the end surface 5 as shown in FIG. 9B.

Each of the first to fourth wave-guides 21, 22, 23 and 24 was 500 microns in length. The core layers 212/222/232/242 were 3 microns in width and 3 microns in thickness. The optical wave-guides 21, 22, 23 and 24 were fabricated on a silicon substrate, and the core layers 212/222/232/242 were sandwiched between the lower clad layers 211/221/231/241 of 10 microns thick and the upper clad layer of 10 microns thick. The clad layers 211/221/231/241 were made of BPSG (Boro-Phospho-SilicateGlass), and the core layers 211/221/231/241 were also made of BPSG. However, the specific refractive index was different among the clad/core layers 211/221/231/241 and 212/222/232/242. The clad layers 211/221/231/241 and core layers 212/222/232/242 were selectively grown on the substrate by using a chemical vapor deposition.

The present inventor measured the specific refractive index at wavelength of 1.55 microns. The specific refractive index of the first clad layer 211, second clad layer 221, third clad layer 231 and fourth clad layer 241 were 1.445, 1.472, 1.452 and 1.460, respectively, and the specific refractive index of the first core layer 212, second core layer 222, third core layer 232 and fourth core layer 242 were 1.474, 1.472, 1.467 and 1.467, respectively. The refractive index of the clad/core layers was arbitrary in so far as the specific refractive index was fallen onto the above-described values. Moreover, the core layers 212/22/232/242 were permitted to vary the width depending upon the difference in specific refractive index.

The present inventor prepared a comparative sample. The comparative sample was constituted by the wave-guide 21, only. The present inventor coupled the first sample of the optical coupling device and the comparative sample to optical fibers 26, respectively, and measured the coupling loss. The coupling loss of the comparative sample was 2.7 dB, and the coupling loss of the first sample was reduced to 0.5 dB. Thus, the present inventor confirmed that the spot size converter, i.e., the optical wave-guides 22/23/24 according to the present invention was effective against the coupling loss.

Figure 10A:
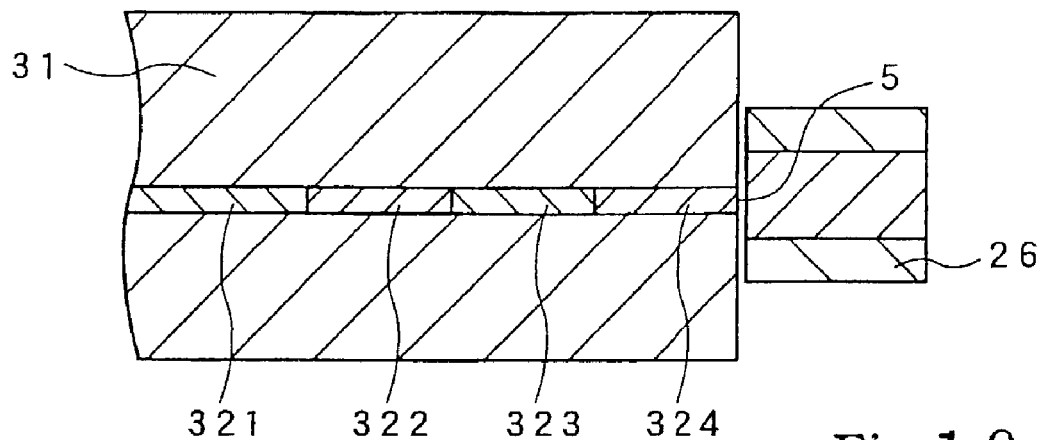
FIG. 10A is a cross sectional view showing the structure of another sample of the optical coupling device implementing the first embodiment.
Figure 10B:
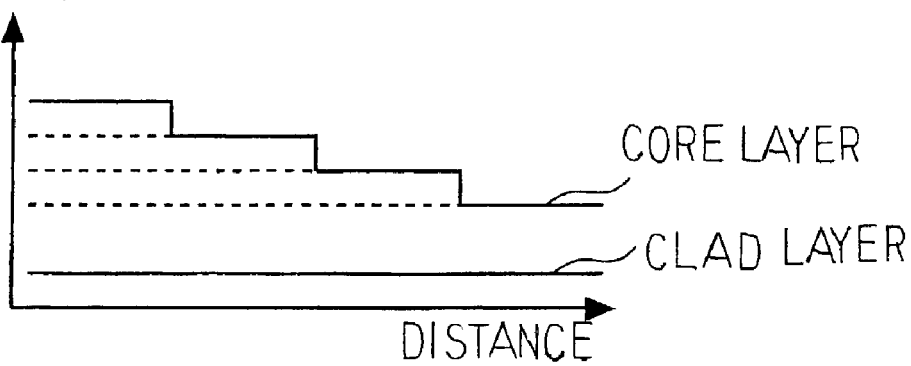
FIG. 10B is a graph showing the relation between the specific refractive index and a distance of the optical wave-guide in the sample.

FIG. 10A shows another sample of the optical coupling device implementing the first embodiment. The cross section was in parallel to the major surface of the substrate so that FIG. 10A is a plan view. The sample is hereinafter referred to as "second sample". The second sample was different from the first sample in that a clad layer 31 was shared among four optical wave-guides. As shown in FIG. 10B, the clad layer 31 had the refractive index n(0), and was constant over the distance. On the other hand, the core layers 321, 322, 323, 324 had different values of the refractive index n(1), n(2), n(3) and n(4), and was stepwise reduced toward the end surface 5. As a result, the difference in specific refractive index was stepwise reduced toward the end surface 5.

The present inventor measured the refractive index of the clad and core layers 31/321/322/323/324. The clad layer had the refractive index n(0) of 1.44, and the values of the refractive index n(1) to n(4) were 1.474, 1.467, 1.460 and 1.452, respectively. The clad layer 31 was grown over the major surface of the substrate by using the chemical vapor deposition, and the core layers 321/322/323/324 were selectively embedded in the clad layer 31. Thus, the fabrication process was drastically simplified.

The present inventor measured the coupling loss for the second sample. The coupling loss was mainly dominated by the difference in specific refractive index between the clad layer 31 and the core layers 321/322/323/324, and was 0.5 dB.

Figure 11:
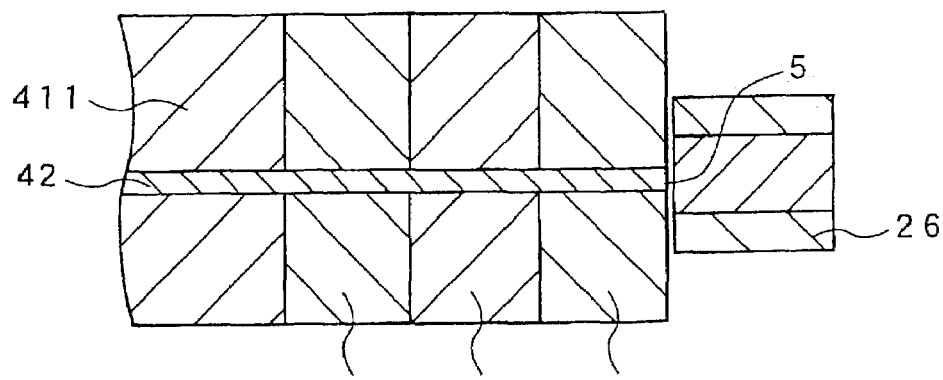
FIG. 11A is a cross section showing the structure of yet another sample of the optical coupling device implementing the first embodiment.
FIG. 11B is a graph showing the refractive index of clad/core layers of the sample.
Figure 11:
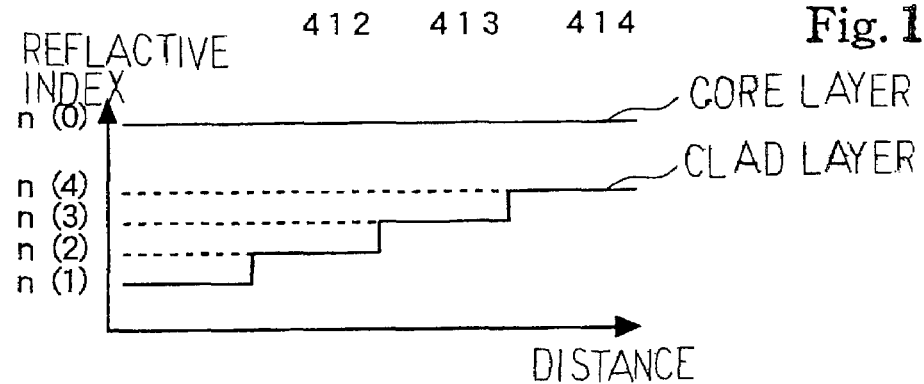

FIG. 11A shows yet another sample of the optical coupling device implementing the first embodiment. The cross section was in parallel to the major surface of the substrate so that FIG. 11A is a plan view. The sample was hereinafter referred to as "third sample". The third sample was different from the first sample in that a core layer 42 was shared among four optical wave-guides. As shown in FIG. 11B, the core layer 42 had the refractive index n(0), and was constant over the distance. On the other hand, the clad layers 411, 412, 413, 414 had different values of the refractive index n(1), n(2), n(3) and n(4), and was stepwise increased toward the end surface 5. As a result, the difference in specific refractive index was stepwise reduced toward the end surface 5.

The present inventor measured the refractive index of the core and clad layers 41/411/412/413/414. The core layer had the refractive index n(0) of 1.475, and the values of the refractive index n(1) to n(4) were 1.446, 1.453, 1.460 and 1.468, respectively.

The present inventor measured the coupling loss for the third sample. The coupling loss was 0.4 dB. The coupling loss was improved in the third sample rather than the second sample. This was because of the fact that the core layer 42 was continued over the optical wave-guide. The continuous core layer 42 was free from the excessive loss at the boundaries between the cores. For this reason, the third sample was less in coupling loss than the second sample.

Figure 12A:
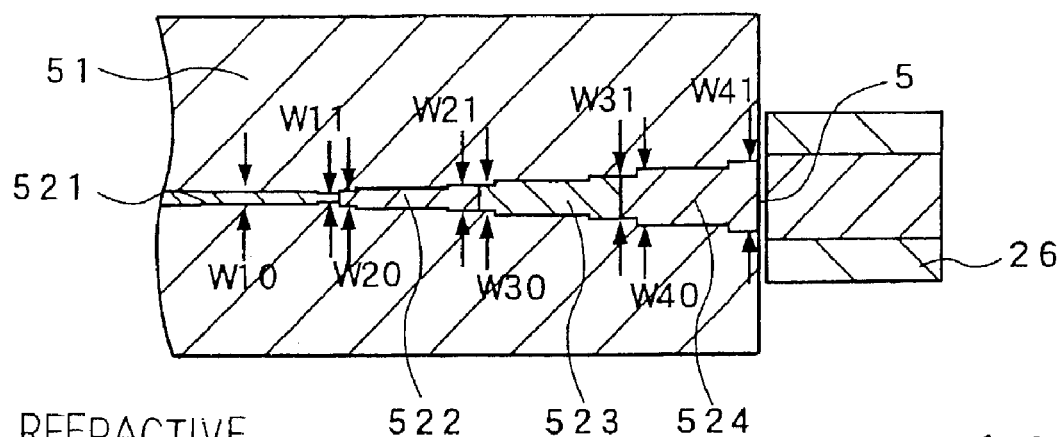
FIG. 12A is a cross sectional view showing the structure of still another sample of the optical coupling device implementing the first embodiment.

FIG. 12A shows still another sample of the optical coupling device implementing the first embodiment. The cross section was in parallel to the major surface of the substrate so that FIG. 12A is a plan view. The sample was hereinafter referred to as "fourth sample". The fourth sample was different from the second sample in that the core layers 521/522/523/524 were varied in width so as to taper the core layers. The clad layer 51 was shared among the optical wave-guides. The optical wave-guide 51/521 was converged, and the other optical wave-guides 51/522, 51/523 and 51/524 were diverged. However, the optical waveguides were tapered in any direction in so far as the spot size was enlarged in the direction of propagating the light.

Figure 12B:
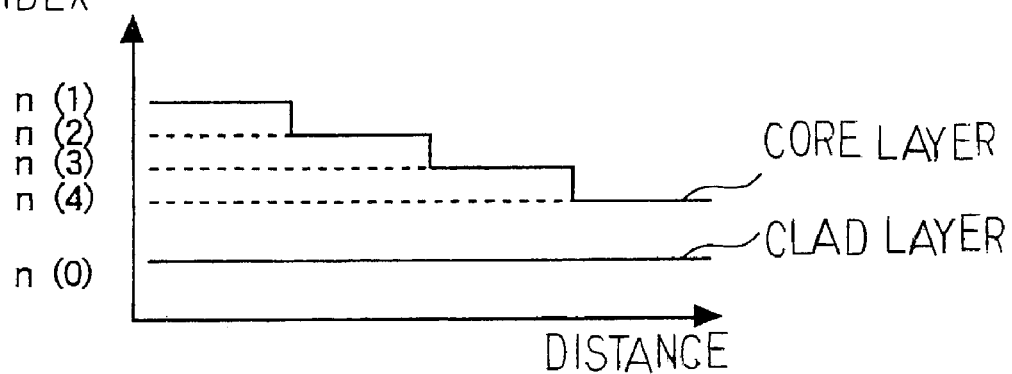
FIG. 12B is a graph showing the refractive index of clad/core layers of the sample.

In FIG. 12A, the width w10, w11, w20, w21, w30, w31, w40 and w41 were 3 microns, 4 microns, 1.6 microns, 2 microns, 4 microns, 5 microns and 8 microns, respectively. All the tapered sections were defined by straight lines, and were 500 microns long. The other conditions of the fourth sample were same as those of the second sample. For example, the refractive index of the clad/core layers 51/521/522/523/524 was equal to those of the clad/core layers 31/321/322/323/324 as shown in FIG. 12B. The present inventor measured the coupling loss, and found the coupling loss to be 0.3 dB. Thus, the spot size converters with the tapered sections were effective against the coupling loss.

FIG. 13A shows yet another sample of the optical coupling device implementing the first embodiment. The cross section was vertical to the major surface of the substrate so that FIG. 13A is a side view. The sample was hereinafter referred to as "fifth sample". The fifth sample was different from the second sample in that the depth of the four wave-guides was varied in depth as well as in width. On the major surface of a substrate 53 was grown a lower clad layer 511 which had the thickness stepwise decreased toward the end surface 5. Core layers 521, 522, 523 and 524 were formed on the lower clad layer 511, and were stepwise increased in both width and height toward the end surface 5. The core layers 521, 522, 523 and 524 were covered with an upper clad layer 512, which was stepwise decreased in thickness toward the end surface 5. The total thickness of lower/upper clad layers 511/512 and core layers 521/522/523/524 was constant over the optical wave-guide.

The lower clad layer 511 had the refractive index equal to that of the upper clad layer 512, and was constant over the optical wave-guide as indicated by n(0) in FIG. 13B. The core layers 521, 522, 523 and 524 were stepwise decreased in refractive index toward the end surface 5 as indicated by n(1), n(2), n(3) and n(4). The leftmost wave-guide 511/521/512 had the maximum difference in specific refractive index, and the rightmost wave-guide 511/524/512 had the minimum difference in specific refractive index. Thus, when the difference in specific refractive index was reduced, the thickness of the core layers 521, 522, 523 and 524 were increased.

In the fifth sample, the core layers 521, 522, 523 and 524 were 3 microns thick, 4.5 microns thick, 5 microns thick and 6 microns thick, respectively, and were constant in thickness. Other features of the fifth sample were same as those of the fourth sample. The present inventor measured the coupling loss, and determined that the coupling loss was 0.2 dB.

Figure 14:
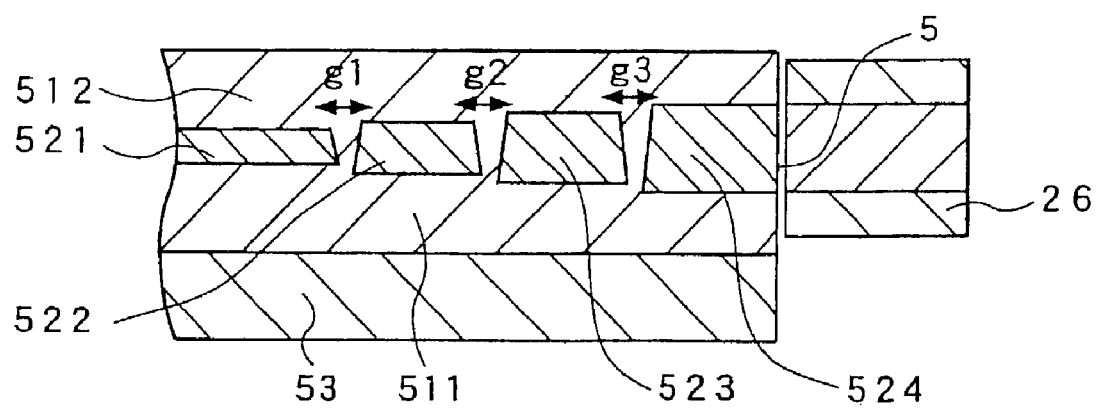
FIG. 14 is a cross sectional view showing the structure of still another sample of the optical coupling device implementing the first embodiment.

FIG. 14 shows still another sample of the optical coupling device implementing the first embodiment. The cross section was vertical to the major surface of the substrate so that FIG. 14 is a side view. The sample was hereinafter referred to as "sixth sample". The sixth sample was different from the fifth sample in that the core layers 521, 522, 523 and 524 were spaced from one another and that the end surfaces of the core layers 521/522/523/524 were oblique with respect to the surface vertical to the major surface of the substrate 53. Although the four core layers 521/522/523/524 were spaced from one another in the sixth sample, selected one or ones of the core layers might be spaced from the other core layers. This feature was desirable from the viewpoint that the overlapped portions between the core layers were removed from the optical coupling device and the viewpoint that the oblique surfaces prevented the core layers from reflection on the end surfaces of the core layers.

In the sixth sample, the gaps g1, g2 and g3 were 1.5 microns long, and the end surfaces of the core layers 521/522/523/524 inclined at 80 degrees. The present inventor measured the coupling loss, and determined that the coupling loss was 0.2 dB. The cross-talk of the reflected ray was reduced from −30 dB to −50 dB. If the gaps g1, g2 and g3 were too short, the overlapped portions were left in the optical wave-guide. On the other hand, if the gaps g1/g2/g3 were too long, the excess loss was serious. The present inventor found that the gaps g1/g2/g3 were to be fallen within the range from 0.5 micron to 5 microns and that the oblique surfaces were to be fallen within the range between 75 degrees and 88 degrees.

Figure 15A:
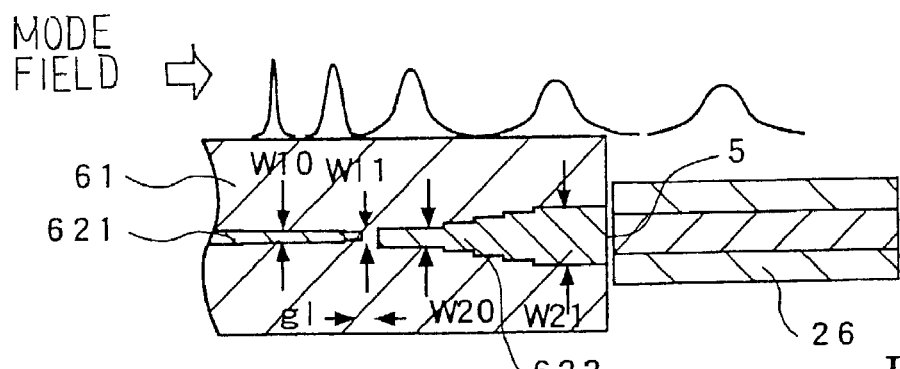
FIG. 15A is a cross sectional view showing a cross section of yet another sample of the optical coupling device implementing the first embodiment.
Figure 15B:
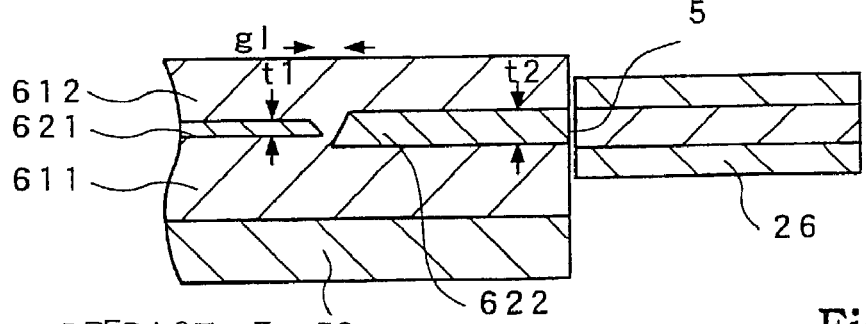
FIG. 15B is a cross sectional view showing another cross section of the sample.

FIGS. 15A and 15B show yet another sample of the optical coupling device implementing the first embodiment. The cross sections were parallel and vertical to the major surface of the substrate so that FIGS 15A and 15B are a plane view and a side view. The sample was hereinafter referred to as "seventh sample". Each of the samples described hereinbefore has the four wave-guides. Although the mode mismatch is reduced inversely proportional to the number of wave-guides, the fabrication process is complicated. It is desirable for the manufacturer to fabricate the optical coupling device through a simple process.

Figure 15C:
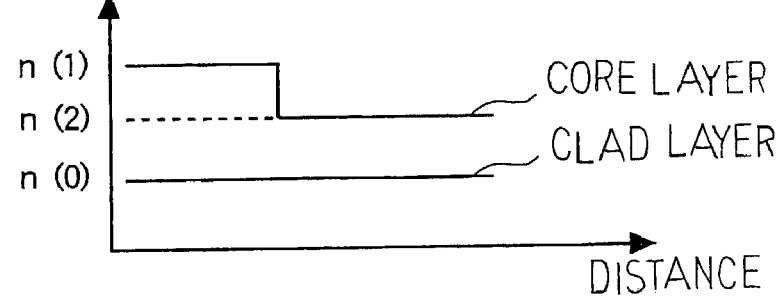
FIG. 15C is a graph showing the refractive index of clad/core layers of the sample.

The present inventor tried to find the conditions on which the optical coupling device with two wave-guides, i.e., n=2 exhibited the coupling loss through the simulation and experiments. The upper and lower clad layers 612/611 were formed of BPSG, the refractive index of which was 1.450. The first core layer 621 and second core layer 622 were made of SiON, the refractive index of which was 1.480 for the first core layer and 1.462 for the second core layer (see FIG. 15C). As a result, the difference in specific refractive index was 2% in the first wave-guide 611/621/612 and 0.8% in the second wave-guide 611/622/612. The clad layers 611/612 and core layers 621/622 were deposited through an atmospheric pressure chemical vapor deposition.

The first wave-guide 611/621/612 was 3.0 microns thick, i.e., t1 and 3.0 microns wide, i.e., W10, and had a convergent spot size converter. The width was reduced from 3 microns to 1.4 microns, i.e., W11. On the other hand, the second wave-guide 611/622/612 was 5.5 microns thick, i.e., t2, and the width is increased from 5.5 microns to 10 microns, i.e., W20 to W21. The first wave-guide 611/621/612 was spaced from the second wave-guide 611/622/612 by 2 microns, i.e., g=2 microns, and the end surface of the first and second wave-guides opposite to each other inclined at 80 degrees. The present inventor measured the coupling loss of the seventh sample, and determined that the coupling loss was 0.28 dB.

The present inventor fabricated a comparative sample with the prior art convergent optical wave-guide. Although the width of the convergent optical wave-guide was reduced to 0.9 micron at the tip of the wave-guide, the coupling loss was of the order of 0.7 dB. The present inventor investigated the influences of the width at the tip of the convergent spot size converter to the production yield, and found that the convergent spot size converter did not have any serious influence on the production yield in so far as the width was equal to or greater than 1.2 microns. Thus, the present inventor confirmed that the seventh sample was effective against the coupling loss. Moreover, only the two wave-guides were built in the seventh sample so that the fabrication process was surely simplified.

Figure 16:
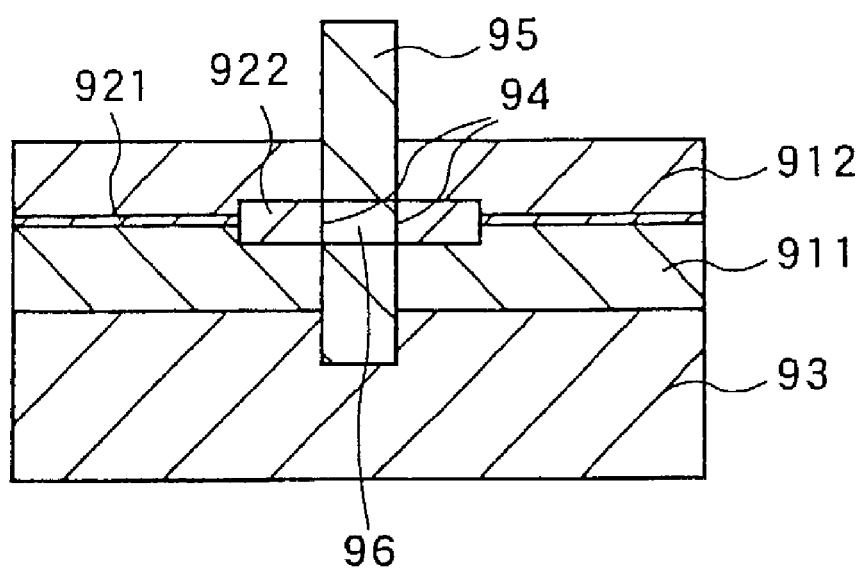
FIG. 16 is a cross sectional view showing the structure of still another sample of the optical coupling device implementing the first embodiment.

FIG. 16 shows still another sample of the optical coupling device implementing the first embodiment. The cross section was vertical to the major surface of the substrate 93 so that FIG. 16 is a side view. The sample was hereinafter referred to as "eighth sample". A groove was formed in an optical wave-guide 911/921/922/912 on a substrate 93 by using a dicing technique, and a half wave plate 95 was inserted in the groove. The half wave plate 95 was adhered to the optical coupling device by using adhesive compound. A pair of optical wave-guides, which was similar in structure to the seventh sample, was opposed to each other across the groove. The light was not confined in the half wave plate 95, i.e., the free propagation.

Figure 2:
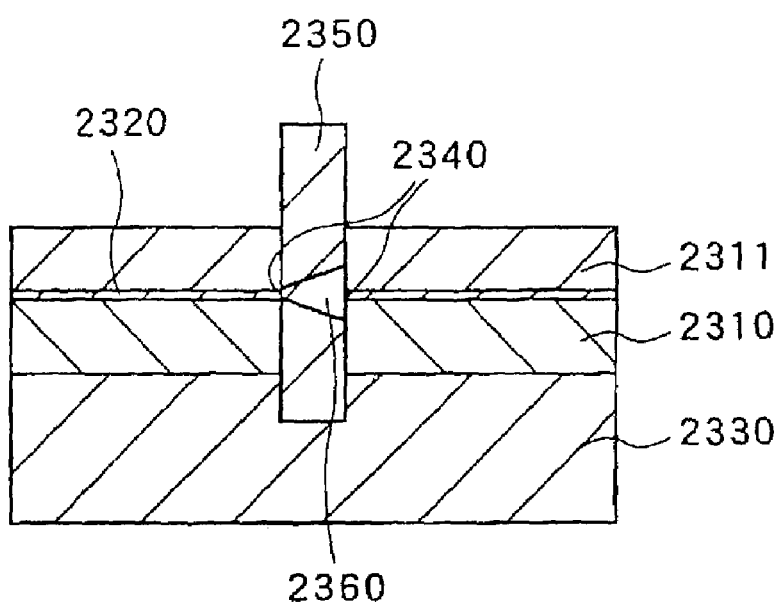
FIG. 2 is a cross sectional view showing the structure of another prior art optical wave-guide device assembled with the thin film element.
Figure 3:
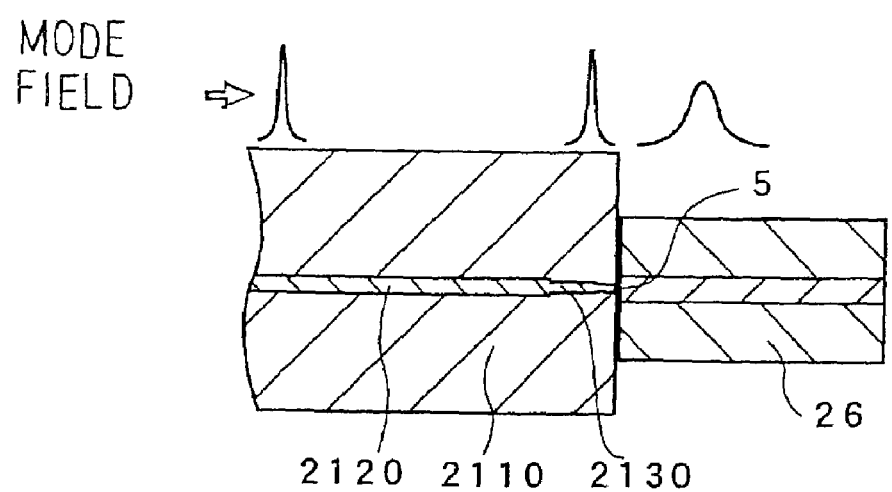
FIG. 3 is a cross sectional view showing the structure of the prior art optical wave-guide device with built-in convergent spot size converter.
Figure 4:
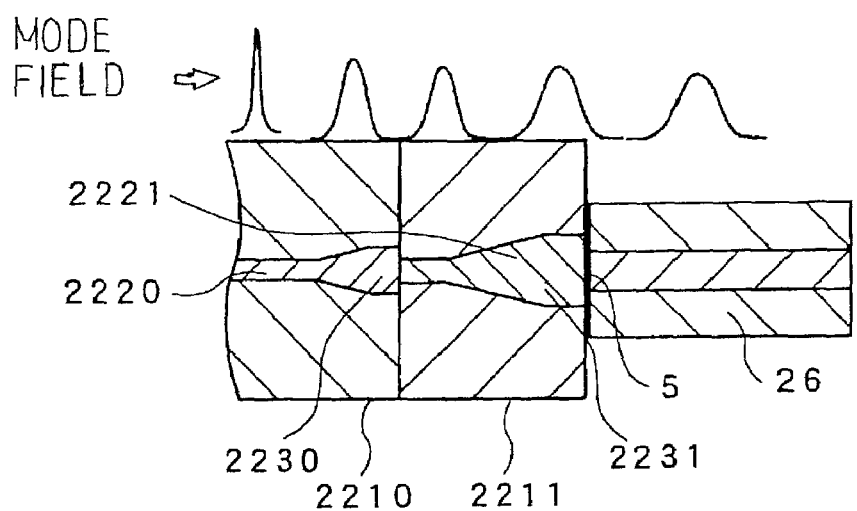
FIG. 4 is a cross sectional view showing the structure of the prior art optical wave-guide device proposed by Takagi et. al.

The present inventor measured the excess loss, and determined that the excess loss was 0.3 dB by virtue of the increased spot size on both sides of the half wave plate 95. The present inventor further fabricated a comparative sample of the prior art optical device shown in FIG. 2. The diffraction was serious in the comparative sample, and the excess loss at the gap of 30 microns was 1.5 dB.

The present inventor further fabricated a modification of the eighth sample. The half wave plate 95 was replaced with polymer. The polymer was injected into the groove, and offered the free propagation to the light. The present inventor measured the excess loss, and confirmed that the piece of polymer was effective against the loss.

Samples of Second Embodiment

Figures 17A, 17B:
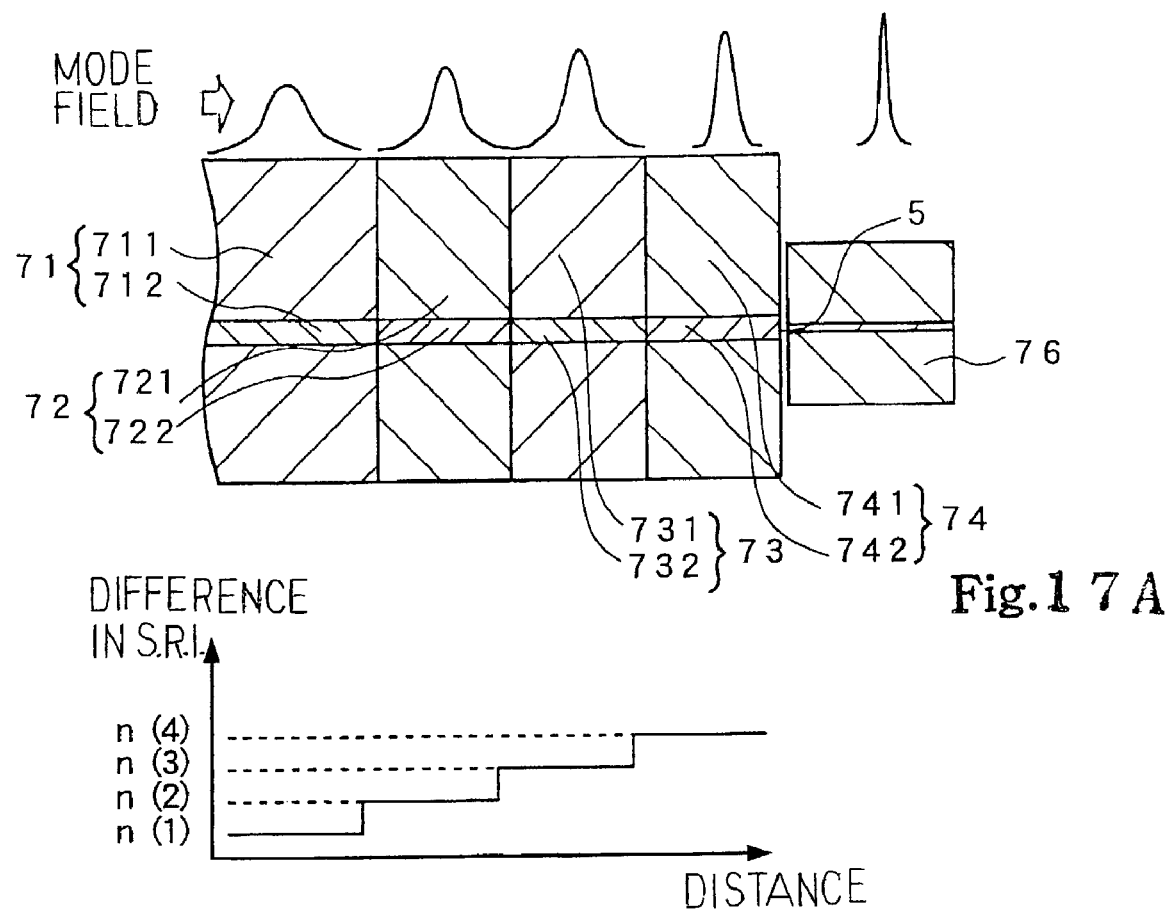
FIG. 17A is a cross sectional view showing the structure of a sample of the optical coupling device implementing the second embodiment.
FIG. 17B is a graph showing the difference in specific refractive index of clad/core layers of the sample.

FIG. 17A shows a sample of the optical coupling device implementing the second embodiment. The cross section was in parallel to the major surface of the substrate so that FIG. 17A shows the cross section. The sample is hereinbelow referred to as "first sample". The optical coupling device had an optical wave-guide consisting of four wave-guides 71, 72, 73 and 74, and the wave-guide 74 was coupled to a semiconductor optical element 76. The semiconductor element 76 served as a semiconductor spot size converting optical amplification element. The distance between the end surface 5 and the semiconductor optical element 76 was 5 microns.

The substrate was made of silicon. The lower and upper clad layer 711/721/731/741 were made of GPSG, and the core layers 712/722/732/742 were also made of GPSG. The lower clad layers, core layers and upper clad layers were deposited on the major surface of the substrate by using the atmospheric pressure chemical vapor deposition, and each of the clad layers was 10 microns thick. Each of the wave-guides 71/72/73/74 was 500 microns long, and each core layer 712/722/732/742 was 3 microns wide and 3 microns thick.

The clad layers 711/721/731/741 were equal in refractive index to one another. However, the core layers 712/722/732/742 had individual values of the refractive index. The specific refractive index was regulated in such a manner that the optical wave-guide was stepwise increased in difference in specific refractive index toward the end surface 5. The present inventor measured the difference in specific refractive index. The refractive index of the clad layers 711/721/731/741, core layer 712, core layer 722, core layer 731 and core layer 742 at 1.55 micron wavelength was 1.445, 1.455, 1.463, 1.470 and 1.477. The difference in specific refractive index n(1) of the wave-guide 71 was 0.7%, the difference in specific refractive index n(2) of the wave-guide 72 was 1.2%, the difference in specific refractive index n(3) of the wave-guide 73 was 1.7%, and the difference in specific refractive index n(4) of the wave-guide 74 was 2.2%.

The refractive index of the clad/core layers might have arbitrary values in so far as the difference in specific refractive index n(1) to n(4) was fallen within the abovementioned values. The clad layers 711/721/731/741 might have individual values of the refractive index different from one another. The width of the core layers 712/722/732/742 might be varied depending upon the difference in specific refractive index.

The present inventor measured the coupling loss between the first sample and the semiconductor optical element 76, and determined that the coupling loss was 1.2 dB. The present inventor fabricated a comparative sample. The comparative sample had an optical wave-guide similar to the wave-guide 71, and the optical wave-guide was optically coupled to the semiconductor optical element. The present inventor measured the coupling loss, and determined that the coupling loss of the comparative sample was 3.0 dB. Thus, the spot size converter, i.e., the wave-guides 72/73/74 were effective against the coupling loss.

Figures 18A, 18B:
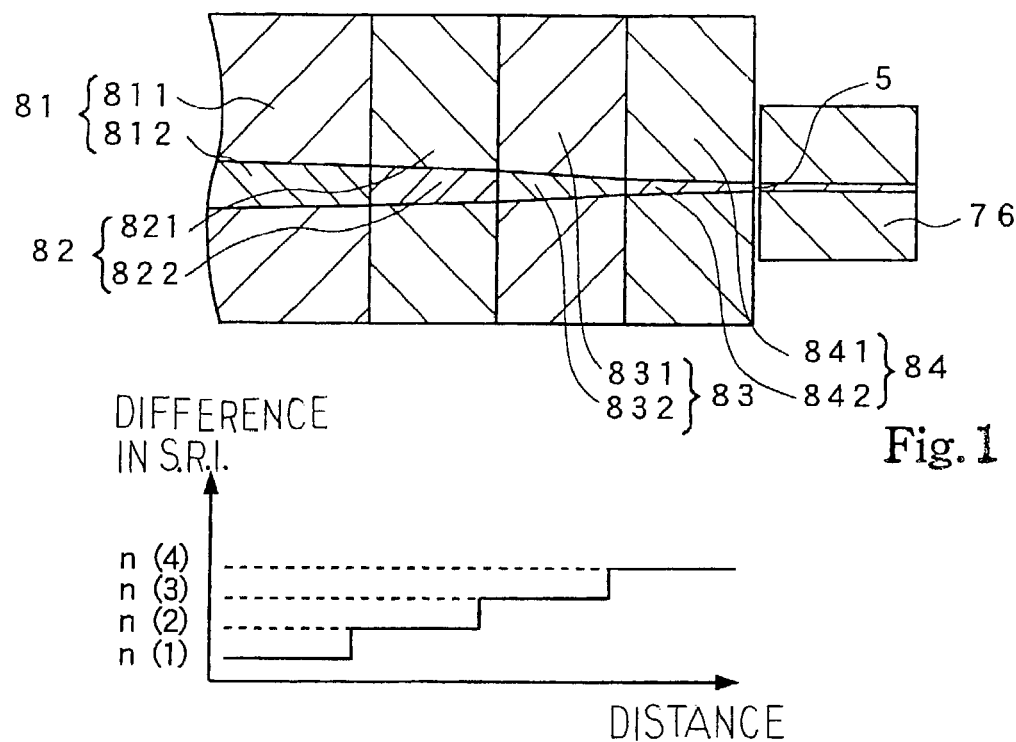
FIG. 18A is a cross sectional view showing the structure of another sample of the optical coupling device implementing the second embodiment.
FIG. 18B is a graph showing the difference in specific refractive index of clad/core layers of the sample.

FIG. 18A shows another sample of the optical coupling device implementing the second embodiment. The cross section was in parallel to the major surface of the substrate so that FIG. 18A is a plan view. The sample is hereinafter referred to as "second sample". The second sample had an optical wave-guide, which consisted of four wave-guides 81, 82. 83 and 84, and the wave-guide 84 was optically coupled to a semiconductor optical element 76. The wave-guides 81, 82, 83 and 84 were implemented by clad layers 811/821/831/841 and core layers 812/822/832/842.

A difference between the first sample and the second sample was that the core layers 812/822/832/842 were tapered toward the end surface 5. The other features were similar to those of the first sample. The core layer 842 had the width of 2 microns on the end surface 5. The present inventor measured the coupling loss, and determined that the coupling loss was 0.9 dB. Thus, the present inventor confirmed that the tapered core layers 812/822/832/842 were conducive to the improvement in coupling loss.

In the first and second samples, the thickness may be varied depending upon the difference in specific refractive index. This feature results in that the spot size is effectively changed. When the difference in specific refractive index is small, the thickness is increased; when the difference in specific refractive index is large, the thickness is decreased.

As will be understood from the foregoing description, the optical coupling device according to the present invention is available for the optical coupling to an optical device with a spot size smaller than that of the optical coupling device, and is effective against the coupling loss.

THIRD EMBODIMENT

Figure 19:
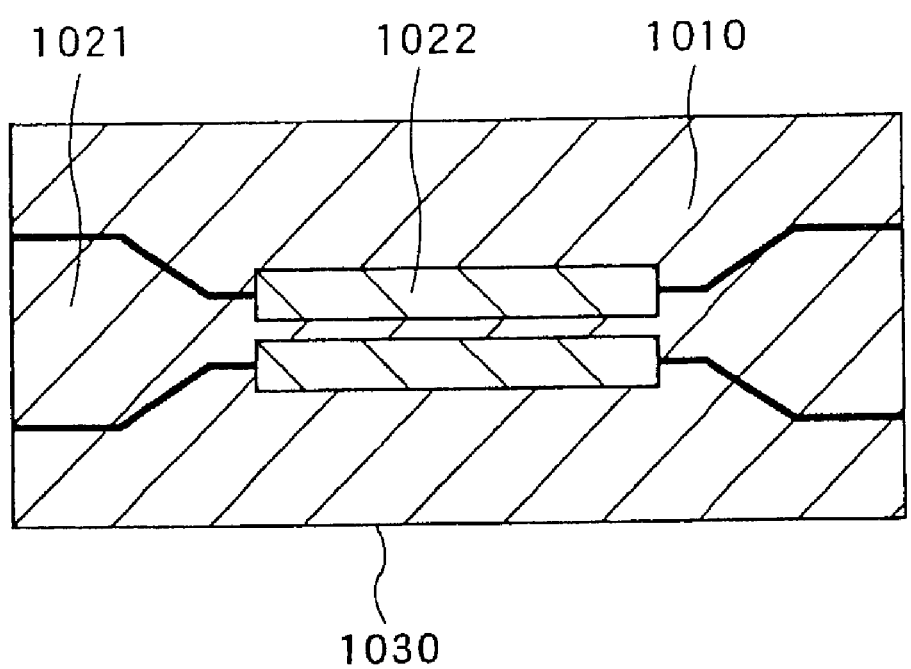
FIG. 19 is a cross sectional view showing the structure of yet another optical coupling device according to the present invention.

Turning to FIG. 19 of the drawings, an optical coupling device embodying the present invention is fabricated on a substrate, and includes a directional optical coupler. The directional optical coupler is implemented by an optical wave-guide, which has a clad layer 1010 and core layers 1021/1022. The core layers 1021 and 1022 are hereinafter referred to as "first core layer" and "second core layer", respectively.

The first core layer 1021 is optically coupled to the second core layer 1022, and the second core layer 1022 forms a proximity wave-guide interference circuit together with a second core layer of another optical wave-guide arranged in parallel to the optical wave-guide 1010/1021/1022.

The present inventor fabricated a sample of the optical coupling device implementing the third embodiment. The sample had the first core layer 1021 made of SiON, the refractive index of which was 1.480. The first core layer 1021 was 2.5 microns in both width and thickness. The second core layer 1022 was made of BPSG, the refractive index of which was 1.460, and was 5.5 microns in both width and thickness. The lower and upper clad layers 1010 had the refractive index of 1.450. As a result, the difference in specific refractive index of the first core layer 1021 was 2%, and the difference in specific refractive index of the second core layer 1022 was 0.7%. The coupling portion between the first core layer 1021 and the second core layer 1022 was same as that of the seventh sample shown in FIG. 15A.

The minimum gap between the proximity wave-guides to be stably obtained through the photo-lithography was of the order of 2 microns. The gap in the directional coupler was to be equal to or greater than the minimum gap. In these circumstances, a comparative sample of the directional coupler was implemented by only the first core layer 1021. The perfect coupling length of the comparative sample was 5 millimeters. On the other hand, the perfect coupling length of the sample was only 500 microns. Thus, the present invention was conducive to reduction of the perfect coupling length in the directional coupler.

Fabrication Process

Figure 20A:
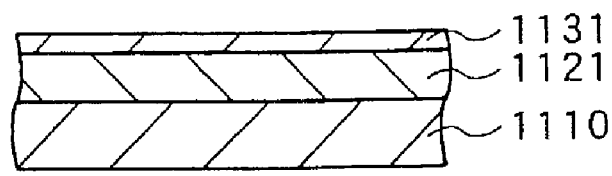
FIGS. 20A to 20E are cross sectional views showing a process for fabricating an optical coupling device according to the present invention.
Figure 20B:
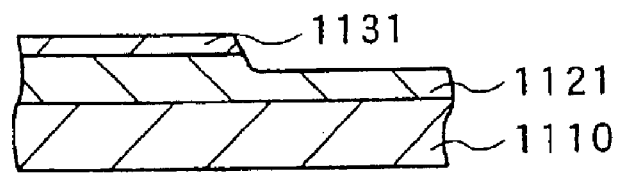

Description is hereinafter made on a process for fabricating an optical coupling device according to the present invention with reference to FIGS. 20A to 20E. The process starts with preparation of a substrate 1110. BPSG is deposited to 10 microns thick over the major surface of the substrate 1110 so that the major surface is covered with a lower clad layer 1121. SiON is further deposited to 3 microns thick over the lower clad layer 1121 so that the lower clad layer 1121 is covered with a core layer 1131 as shown in FIG. 20A. The BPSG and SiON are deposited by using a plasma-assisted chemical vapor deposition. An FHD technique, a CVD technique or a sputtering technique is available for the deposition.

Subsequently, the core layer 1131 is partially removed from a part of the lower clad layer 1121 over an area where another core layer 1134 is to be formed, and the part of the lower clad layer 1121 is further partially removed by using a photo-lithography and an etching technique. The depth of the space formed after the etching is of the order of 4.25 microns.

Figure 20C:
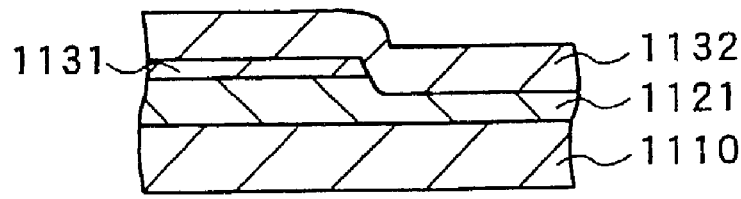
Figure 20D:
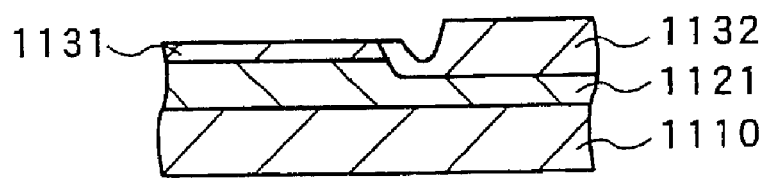

Subsequently, another core layer 1132 is deposited to 5.5 microns thick over the entire surface of the resultant structure as shown in FIG. 20C. The core layer 1132 is partially removed from the upper surface of the core layer 1131 by using the photo-lithography and a reactive ion etching. The resultant structure is shown in FIG. 20D. When the core layer 1132 is removed from the upper surface of the core layer 1131, the photo-resist mask is patterned in such a manner that a gap takes place between the first core layer 1131 and the second core layer 1132. This results in that any residue is not left on the first core layer 1131. However, if the gap is too wide, the excess loss is increased. The present inventor finds the gap to be fallen within the range between 0.5 micron and 5 microns. It is preferable to select the etching conditions such that one of or both of the end surfaces of the core layers 1131/1132 are made oblique. The oblique end surface or surfaces are desirable from the viewpoint that the reflection is reduced.

Upon completion of the reactive ion etching, the centerline of the first core layer 1131 is made coincident with the centerline of the second core layer 1132. The coincidence between the centerlines of the core layers 1131 and 1132 is dependent on the controllability on the etching for forming the space and on the deposition for forming the first and second core layers 1131/1132. The controllability on the etching and deposition is fairly good so that the depth and thickness are fallen within the range of the target thickness ±3%. This means that the misalignment is only 0.2 micron.

Figure 20E:
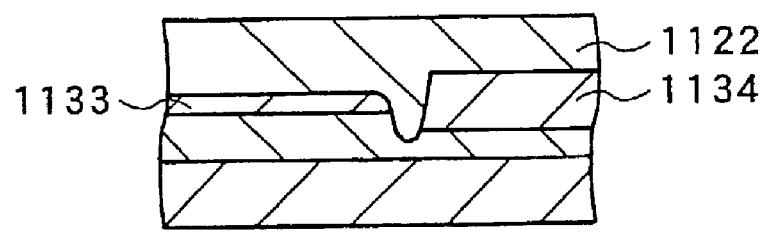

Subsequently, the first and second core layers 1131/1132 are concurrently reduced in width by using the photo-lithography and reactive ion-etching so that core layers 1133/1134 are left on the lower clad layer 1121. The centerlines are never moved by virtue of the concurrent patterning. Finally, an upper clad layer 1122 is deposited over the entire surface of the resultant structure so that the first and second core layers 1133/1134 are sandwiched between the lower clad layer 1121 and the upper clad layer 1122 as shown in FIG. 20E. Thus, the optical coupling device is fabricated through the process shown in FIGS. 20A to 20E.

As will be appreciated from the foregoing description, the difference in specific refractive index is varied along the optical wave-guide so that the optical coupling device is improved in coupling loss. Even though the difference in specific refractive index is widely varied, the increase of the coupling loss is little.

The spot size converter, which is constituted by waveguides varied in difference in specific refractive index, is insertable in an arbitrary position in the optical wave-guide. For this reason, the spot size converter is available for any sort of optical devices. In the sample shown in FIG. 16, the thin plate 95 or a piece of polymer is inserted into the optical wave-guide without increase of the coupling loss The convergent shape is not an indispensable feature of the spot size converter according to the present invention. For this reason, the optical coupling device with the spot size converter is fabricated at a high production yield.

The deposition and etching are well controllable in the process according to the present invention, and offer a large tolerance to the core layers. For this reason, the process according to the present invention achieves a large production yield, and imparts good optical characteristics to the optical coupling device.

The difference in specific refractive index is not only decreased but also increased in the optical coupling devices according to the present invention. This feature is desirable, because the spot size is reduced for an optical element with a small spot size.

Finally, the present invention is applicable to a directional optical coupler, and the directional optical coupler is reduced in the perfect coupling length.

Although particular embodiments of the present invention have been shown and described, it will be apparent to those skilled in the art that various changes and modifications may be made without departing from the spirit and scope of the present invention.

In the process described hereinbefore, the optical coupling device has only two core layers 1133/1134. When more than two core layers 1133/1134 are required for an optical coupling device, the etching step shown in FIG. 20B, deposition step shown in FIG. 20C and etching step shown in FIG. 20C are repeated for forming the other core layers.

The material, thickness of layers, deposition technique and etching techniques described hereinbefore do not set any limit on the process according to the present invention. Those factors are changeable depending upon the optical coupling device to be required.

What is claimed is:

1. An optical coupling device comprising:
a substrate having a major surface, and
at least one optical wave-guide extending in a certain direction, including a clad layer formed over said major surface and a core layer formed in said clad layer and having plural sections different in difference in specific refractive index between said clad layer and said core layer in said certain direction,
wherein one of said plural sections with a small difference in specific refractive index has a portion of said core layer thicker than another portion of said core layer of another of said plural sections with a large difference in specific refractive index.

2. An optical coupling device comprising
a substrate having a major surface, and
plural optical wave-guides each including a clad layer formed over said major surface and a core layer formed in said clad layer, optically coupled to one another, having at least one spot size converter for varying a spot size of light propagated therethrough toward a light output surface,
the core layers of said plural optical wave-guides being decreased in refractive index toward said light output surface,
at least one of said core layers spaced from said light output surface being decreased in cross section,
another of said core layers close to said light output surface being increased in cross section.

3. The optical coupling device as set forth in claim 2, in which one of said plural optical wave-guides closest to said light output surface is optically coupled to an optical device having a spot size larger than the spot size of said one of said plural optical wave-guides.

4. The optical coupling device as set forth in claim 3 in which said optical device is an optical fiber.

5. The optical coupling device as set forth in claim 2 in which an optical thin plate or a piece of polymer is inserted between two of said plural optical wave-guides so that light is radiated into said optical thin plate or said piece of polymer through a free propagation.

6. The optical coupling device as set forth in claim 2 in which the core layer of one of said plural optical waveguides with a small difference in specific refractive index is thicker than the core layer of another of said plural optical waveguides with a large difference in specific refractive index.

7. The optical coupling device as set forth in claim 2, in which at least one of said plural optical wave-guides includes the core layer having an oblique end surface.

* * * * *